United States Patent
Dickson et al.

(10) Patent No.: US 9,001,842 B2
(45) Date of Patent: Apr. 7, 2015

(54) PARALLEL RECEIVER INTERFACE WITH RECEIVER REDUNDANCY

(71) Applicant: International Business Machines Corporation, Armonk, NY (US)

(72) Inventors: Timothy O. Dickson, Danbury, CT (US); Douglas J. Joseph, Southbury, CT (US); Frank D. Ferraiolo, Naples, FL (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 13/736,320

(22) Filed: Jan. 8, 2013

(65) Prior Publication Data
US 2013/0343401 A1 Dec. 26, 2013

Related U.S. Application Data

(60) Provisional application No. 61/664,266, filed on Jun. 26, 2012.

(51) Int. Cl.
*H04L 12/56* (2006.01)
*H04L 12/935* (2013.01)

(52) U.S. Cl.
CPC .................................... *H04L 49/30* (2013.01)

(58) Field of Classification Search
USPC ........................................ 370/419, 463, 250
See application file for complete search history.

(56) References Cited

U.S. PATENT DOCUMENTS 5,978,335 A * 11/1999 Clark et al. ............... 369/53.34
6,317,442 B1 11/2001 Ngai
(Continued)

FOREIGN PATENT DOCUMENTS

GB GB 2 336 075 A 10/1999
WO WO 2008/022886 A1 2/2008

OTHER PUBLICATIONS

Ip et al., "100G and Beyond Transmission Technologies for Evolving Optical Networks and Relevant Physical-Layer Issues", Proceedings of the IEEE, vol. 100, No. 5, May 2012, pp. 1065-1078.
(Continued)

*Primary Examiner* — Mohammad Anwar
(74) *Attorney, Agent, or Firm* — Scully, Scott, Murphy & Presser, P.C.; Anne V. Dougherty, Esq.

(57) ABSTRACT

A communications parallel bus receiver interface having N data lines and method of operation. The parallel bus interface employs receiver redundancy at the bus level such that there are N+1 receiver devices. An input switching network is configured to receive and couple N parallel data signals along respective paths to corresponding parallel-configured bit receiver devices, and adapted to couple one received data signal to two adjacent bit receivers. A calibration device calibrates one of the two adjacent bit receivers, and a qualification device qualifies data decisions made during calibration processes performed by the calibration device. The method cycles through each of N+1 receivers to periodically recalibrate each receiver (one at a time) while N inputs are processed continuously and uninterrupted. The interface is configured such that another receiver is receiving the same data as the receiver that is being calibrated, and the qualifications for receiver calibration can be made with minimal circuit overhead.

21 Claims, 13 Drawing Sheets

(56) References Cited

U.S. PATENT DOCUMENTS

| | | | |
|---|---|---|---|
| 7,072,355 B2* | 7/2006 | Kizer | 370/463 |
| 7,428,553 B2 | 9/2008 | Shin | |
| 2010/0005345 A1 | 1/2010 | Ferraiolo et al. | |
| 2011/0268133 A1 | 11/2011 | Cucchi et al. | |
| 2012/0106687 A1 | 5/2012 | Bulzacchelli et al. | |
| 2012/0314721 A1 | 12/2012 | Bulzacchelli et al. | |

OTHER PUBLICATIONS

Jaussi et al., "8-Gb/s Source-Synchronous I/O Link With Adaptive Receiver Equalization, Offset Cancellation, and Clock De-Skew", IEEE Journal of Solid-State Circuits, vol. 40, No. 1, pp. 80-88, Jan. 2005.

Beukema et al., "A 6.4-Gb/s CMOS SerDes Core With Feed-Forward and Decision-Feedback Equalization", IEEE Journal of Solid-State Circuits, vol. 40, No. 12, pp. 2633-2645, Dec. 2005.

* cited by examiner

PARALLEL RECEIVER INTERFACE WITH RECEIVER REDUNDANCY

RELATED APPLICATIONS

The present application relates to and claims the benefit of the filing date of U.S. Provisional application Ser. No. 61/664,266 filed Jun. 26, 2012 the entire content and disclosure of which is incorporated by reference as if fully set forth herein.

GOVERNMENT CONTRACT

This invention was made with Government support under Contract No.: H98230-07-C-0409 (awarded by National Security Agency (NSA)). The Government has certain rights in this invention.

FIELD

The present disclosure generally relates high-speed communication interfaces, such as high-speed parallel bus interface for integrated circuits, and more particularly to an implementation of receiver redundancy within a parallel receiver interface to enable calibrations of all receivers in the parallel interface without interrupting data processing.

BACKGROUND

High-speed serial I/O is a critical part of computing systems. In server applications where I/O number in the thousands, achieving low-power and low-area I/O circuitry is paramount. It is common for receivers to be calibrated (i.e., determine sampling clock phase, equalizer coefficients, offset settings, etc) at startup; however, failure to recalibrate during normal receiver operation makes the links susceptible to temperature drifts. Redundant hardware can be employed to enable continuous link recalibration without interrupting data transmission. For example, at the bit receiver level additional parallel paths can be included to enable eye monitoring capabilities or edge sampling for timing recovery. These paths are included in parallel with a data sampling path which processes data in an uninterrupted fashion. This level of redundancy results in at least 100% hardware overhead. To reduce the overhead in a parallel interface, redundant lanes can be included. This approach includes at least one additional transmitter, channel, and receiver within an N-wide parallel interface. N+1 lanes can be included such that N lanes are available for continuous data communication, while the extra lane permits recalibration of all lanes in a "round-robin" fashion. Either approach results in higher power consumption due to the extra circuitry involved. The latter approach also requires additional C4 pins in a parallel interface to enable the extra lane. Moreover, protocol overhead is required to schedule which lane is being recalibrated, and which of the N lanes contain information about the data that is being communicated.

It would be highly desirable to employ bus-level redundancy only within the receiver of a parallel interface to permit periodic recalibration of all receivers. This avoids the 100% overhead associated with bit-receiver level redundancy. Moreover, it avoids the transmit and lane overhead at the bus level associated with lane redundancy.

BRIEF SUMMARY

There is provided, in one aspect, a system and method to employ receiver redundancy ("receiver shadowing") at the bus level rather than using an additional redundant ("shadow") lane. This eliminates overhead in the transmitter and the protocol layer, as well as additional C4 pins in the bus, while still enabling periodic recalibration of all of the receivers in the bus.

In one aspect, a parallel I/O bus receiver interface comprises: an input switching network configured to receive and couple N parallel data signals along respective paths to corresponding receiver devices (RX) of N+1 parallel-configured bit receiver devices, and configured to couple one received data signal to two adjacent bit receivers; a calibration logic device used for calibrating one of the two adjacent bit receivers; a qualification logic device used to qualify data decisions made during calibration processes performed by the calibration logic device; and an output switching network configured to route an output of the bit receiver being calibrated to the calibration logic block, and simultaneously route outputs of the remaining N bit receivers of the N+1 parallel-configured receivers as N-bit wide parallel data signal outputs, wherein an output of one output of the remaining N bit receivers is simultaneously routed to the qualification logic block.

In a further aspect, there is provided a method for calibrating receivers of a parallel I/O bus receiver interface. The method comprises: configuring an input switching network to receive and couple N parallel data signals along respective paths to corresponding receiver devices (RX) of N+1 parallel-configured bit receiver devices, wherein the switching network is configured to couple one received data signal to two adjacent bit receivers; calibrating, using a calibration logic device, one of the two adjacent bit receiver devices; qualifying, using a qualification logic device, data decisions made during calibration processes performed by the calibration logic device; and configuring an output switching network to route an output of the bit receiver being calibrated to the calibration logic block, and simultaneously route outputs of the remaining N bit receivers of the N+1 parallel-configured receivers as N-bit wide parallel data signal outputs, wherein an output of one output of the remaining N bit receivers is simultaneously routed to the qualification logic block.

BRIEF DESCRIPTION OF THE SEVERAL VIEWS OF THE DRAWINGS

The objects, features and advantages of the present invention will become apparent to one of ordinary skill in the art, in view of the following detailed description taken in combination with the attached drawings, in which.

DETAILED DESCRIPTION

Figure 1:
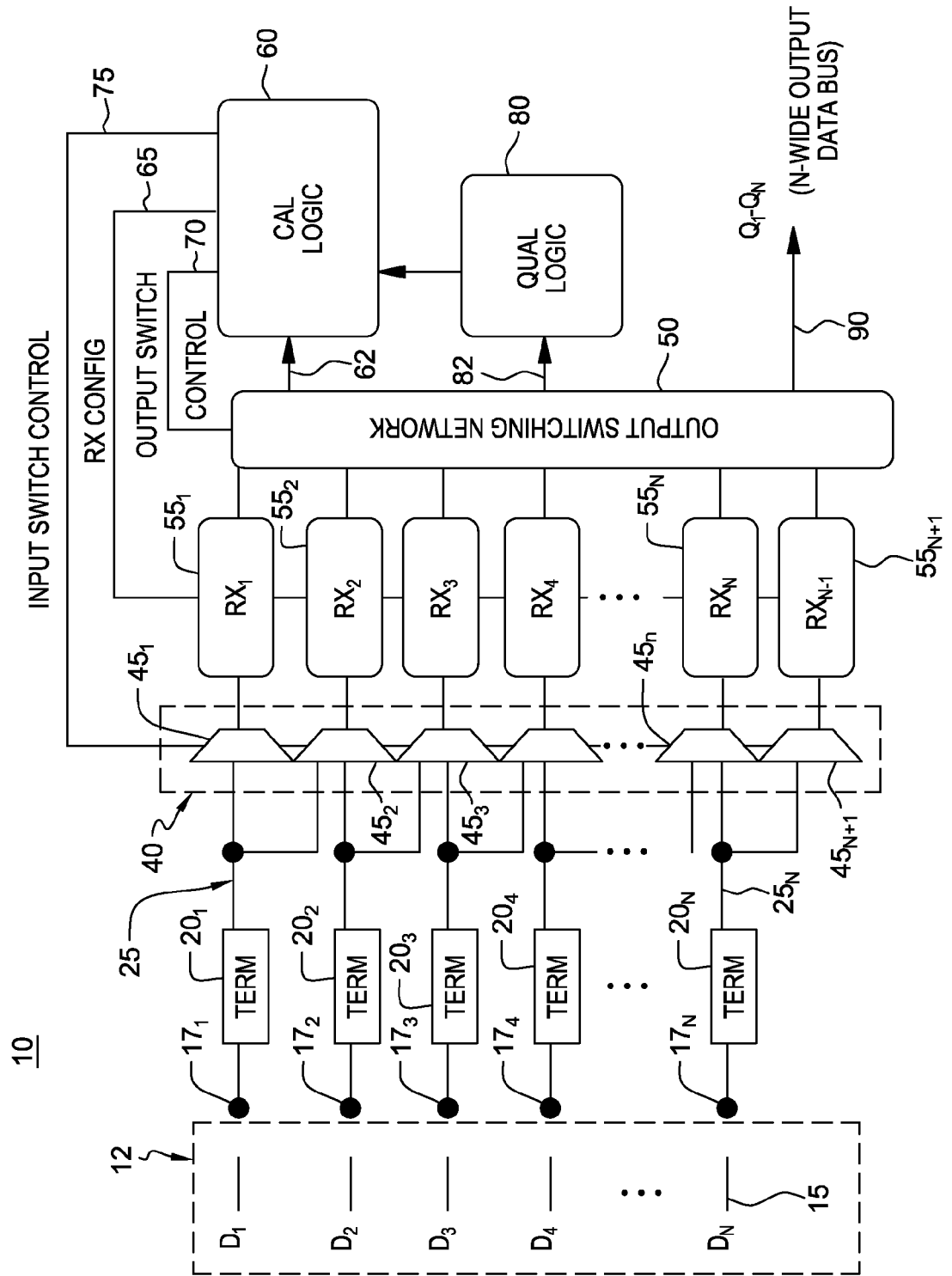
FIG. 1 depicts an embodiment of a parallel receiver architecture 10 using receiver redundancy.

FIG. 1 depicts a high-speed (e.g., multi-Gb/s speeds) communications parallel bus interface 10 implementing receiver shadowing and a method for implementing receiver calibration with no bandwidth reduction.

As shown in FIG. 1, the interface 10 is a parallel I/O bus interface 10 which includes $RX_1, \ldots, RX_{N+1}$ bit receivers 55 to receive N bits of data $D_1, \ldots, D_N$. As known in the art, each receiver RX may include a bit slicer (e.g., a latch, flip-flop, or comparator) and/or other circuitry, e.g., analog equalizers (e.g., continuous-time linear equalizers CTLEs, feed-forward equalizers FFEs, or decision feedback equalizers DFEs), amplifiers, variable gain amplifiers, and circuitry used to adjust the optimal sampling position of the data relative to a clock (e.g. delay elements, delay-locked loops, or phase interpolators). In order to optimize link performance, it is desirable to perform one or more calibration operations within a bit receiver including, but not limited to: adaptive bit equalization, gain adjustment, clock de-skew or sampling clock phase adjustment, and offset cancellation. In the non-limiting example implementation depicted in FIG. 1, the interface may be scaled for N=8, 16 or some multiple number of parallel bit implementations. The parallel I/O bus interface 10 is configured for performing continuous periodic calibration as described in further detail below.

As known in the art, a data source device, e.g., an integrated circuit in a computing device such as a computer or server, includes a parallel configuration of N transmitter devices (not shown) that generate/drive respective data signals $D_1, \ldots, D_N$ in parallel over N conductors, i.e., data transmission lines or links 15, forming N-bit wide parallel communications bus 12. Although not shown, it is understood that the set of transmitters drive data signals via I/O ports each including a respective I/O pin (not shown) that couples the signals to its connected data line 15.

At the receiver side, interface 10 includes an integrated circuit including high-speed digital communication receiver interface components, wherein data bit signals $D_1, \ldots, D_N$ are coupled from respective transmitters over data lines 15 of bus 12 to respective I/O pins $17_1, \ldots, 17_N$ having respective connected impedance matching input connector or termination $20_1, \ldots, 20_N$ (e.g., a 50 ohm termination resistor or 100 ohm differential termination resistor). Each respective termination $20_1, \ldots, 20_N$ is coupled to input switching network 40 comprising a configuration of multiplexer or selector (MUX) circuits $45_1, \ldots, 45_{N+1}$ operating to pass input data signal to a corresponding receiver device RX 55 of a parallel configuration of receiver devices $55_1, \ldots, 55_{N+1}$ that receive (i.e., sample) a respective data bit signal $D_1, \ldots, D_N$ from a respective data line 15.

In the interface architecture of FIG. 1, MUX or selector circuits $45_2, \ldots, 45_N$ at the input of each bit receiver RX $55_2, \ldots, 55_{N+1}$ in the parallel interface are configured to allow the data signal from one pin to be routed to two possible bit receivers. For example, conductor 25 supplying data signal $D_1$ to MUX or selector circuit $45_1$ for receipt at receiver RX $55_1$ is tapped off or split such that one input of MUX or selector circuit $45_2$ also receives data signal $D_1$. Consequently, the parallel interface can be configured (i.e. programmed or controlled by logic) such that one or both of receivers RX $55_1$ and RX $55_2$ receives data signal $D_1$. Similarly, conductor supplying data signal $D_2$ to MUX or selector circuit $45_2$ for receipt at receiver RX $55_2$ is tapped or split such that one input of MUX or selector circuit $45_3$ also receives data signal $D_2$. Consequently, the parallel interface can be configured such that one or both of receivers RX $55_2$ and RX $55_3$ receives data signal $D_2$. It is understood that, at a given time, if any two receivers in the parallel interface are configured to receive the same data signal, then all other data signals can only be received by a single receiver in order to permit continuous data transmission of all N data signals.

In general, the interface 10 architecture includes N+1 receivers for N data lines, wherein the MUX or selector circuit at the input of each bit receiver in the parallel interface, allows a data signal from one pin to be routed to a one of two bit receivers in accordance with receiver configuration control signals 65 and input switching network control signals 75 generated according to programmed receiver and calibration logic device 60 as will be discussed in detail below.

As a result of incorporating a redundant bit receiver (i.e., N+1 bit receivers to process N data signals) in the parallel interface, one bit receiver can be calibrated (e.g., updating information regarding optimal sampling position, equalizer coefficients, and/or offset compensation) while the remaining N receivers can operate as normal, receiving and recovering data. An output switching network 50 is used to route the outputs of the appropriate N bit receivers to the N-wide output data bus $Q_1$ through $Q_N$ 90. Additionally, for reasons described below, the output switching network couples the output of the bit receiver being calibrated to a calibration logic block 60 via connection 62, and the output of a second receiver to a qualification logic block 80 via connection 82.

When a bit receiver is being calibrated, the output switching network 50 routes the output of that bit receiver to the calibration logic 60 via connection 62. This enables the calibration logic to sense the response of the bit receiver in reaction to a calibration algorithm for the purpose of optimizing the performance of that bit receiver. Some receiver calibration routines may involve processes that can corrupt or destroy the data being processed by that receiver. For example, in order to measure receiver eye amplitude margins it is often necessary to apply large offsets to the input of a bit slicer in order to collapse the input data eye. Once this is done, it is common to measure a bit error rate of the received data. However, in order to measure a bit error rate, the received data pattern must be known. The offset required to collapse the data eye when a logic '1' bit is received is different (at the least, by the sign of the offset applied, but potentially different in sign and magnitude) than the offset required to perform the same function when a logic '0' bit is received. Since the received data has been corrupted in the process of calibrating the bit receiver, and since the received data pattern is not known a priori, it is required that an alternate parallel receiver detect the data. Information from this parallel receiver can then be used to qualify assumptions data decisions made by the adjacent receiver and/or the calibration logic during the process of bit receiver calibration. As another example, sign-sign least-mean squared (SS-LMS) algorithms for the adaptation of an equalizer also require valid data derived from a path in parallel to the path that includes the equalizer being adapted. In the architecture of FIG. 1, the input switching network 40 ensures that a second bit receiver can receive the same input signal as the bit receiver being calibrated. This second bit receiver is available to provide uncorrupted data such that measurements on the bit receiver being calibrated can be appropriately qualified or filtered as required by a calibration algorithm. The output switching network couples (via connection 82) the output of the parallel receiver to the qualification logic 80 that is used to qualify or filter assumptions that might be made by the calibration logic 60 as needed during the normal calibration of bit receiver. It is understood that the receiver providing data to the qualification logic is also simultaneously coupled to one of the $Q_1$ through $Q_N$ output data signals.

Figure 2:
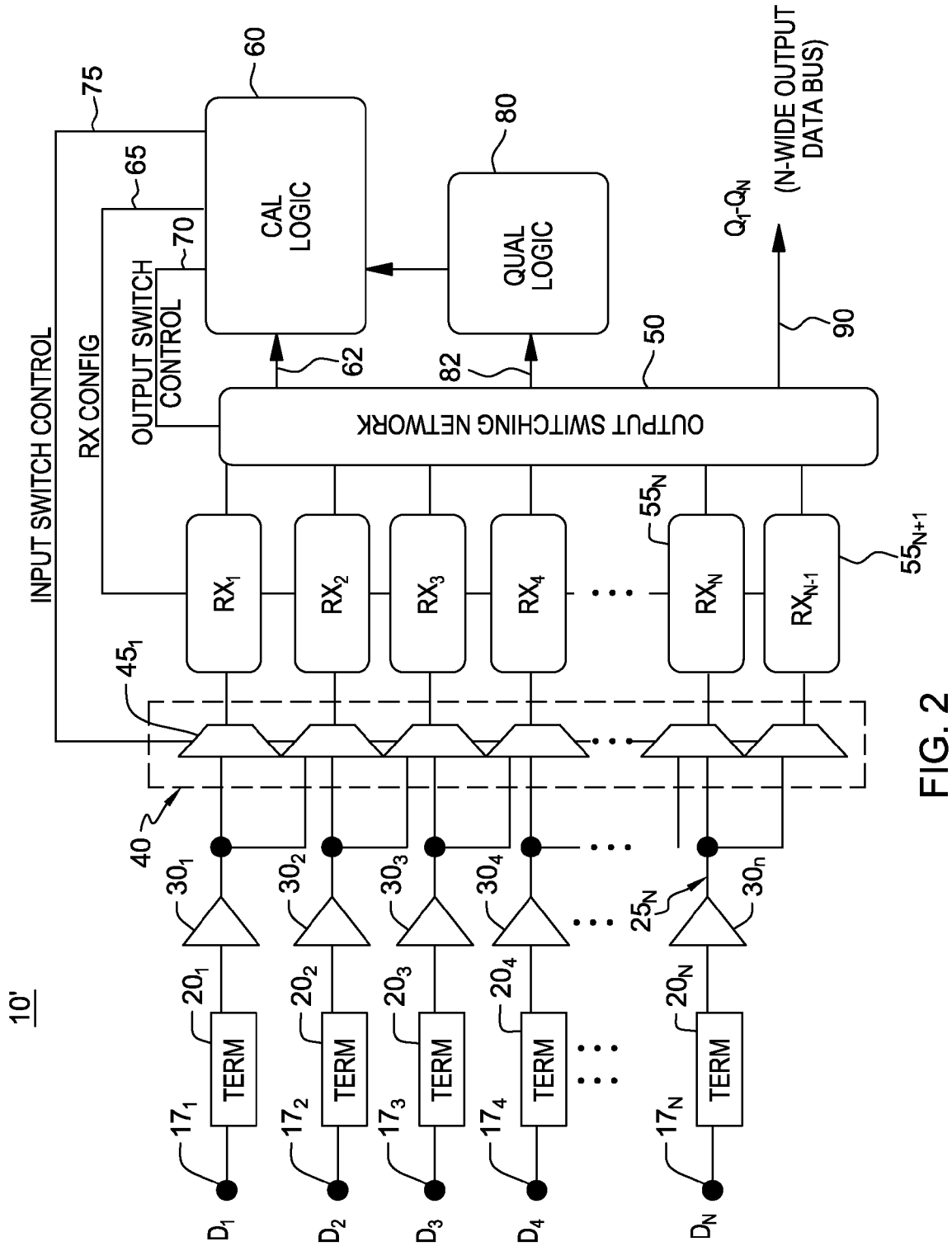
FIG. 2 depicts an alternate embodiment of a parallel receiver architecture 10' using receiver redundancy.

FIG. 2 depicts an alternate embodiment of a parallel I/O bus interface 10' which includes $RX_1, \ldots, RX_{N+1}$ bit receivers 55 to receive N bits of data $D_1, \ldots, D_N$. In this embodiment, a corresponding amplifier device or circuit $30_1, \ldots, 30_N$ is connected between a respective input pin $17_1, \ldots, 17_N$/termination $20_1, \ldots, 20_N$ and corresponding MUXs of the input switching network 40. This amplifier device or circuit $30_1, \ldots, 30_N$ may function as a buffer, a variable gain amplifier (VGA), and in some embodiments, includes an equalizer such as a feedforward equalizer (FFE) or a continuous-time linear equalizer (CTLE).

The embodiments of FIG. 1 and FIG. 2 are not source-synchronous architectures in that the clock for controlling respective RX receiver timing operations are provided locally and not originated at the source transmitter.

Figure 3:
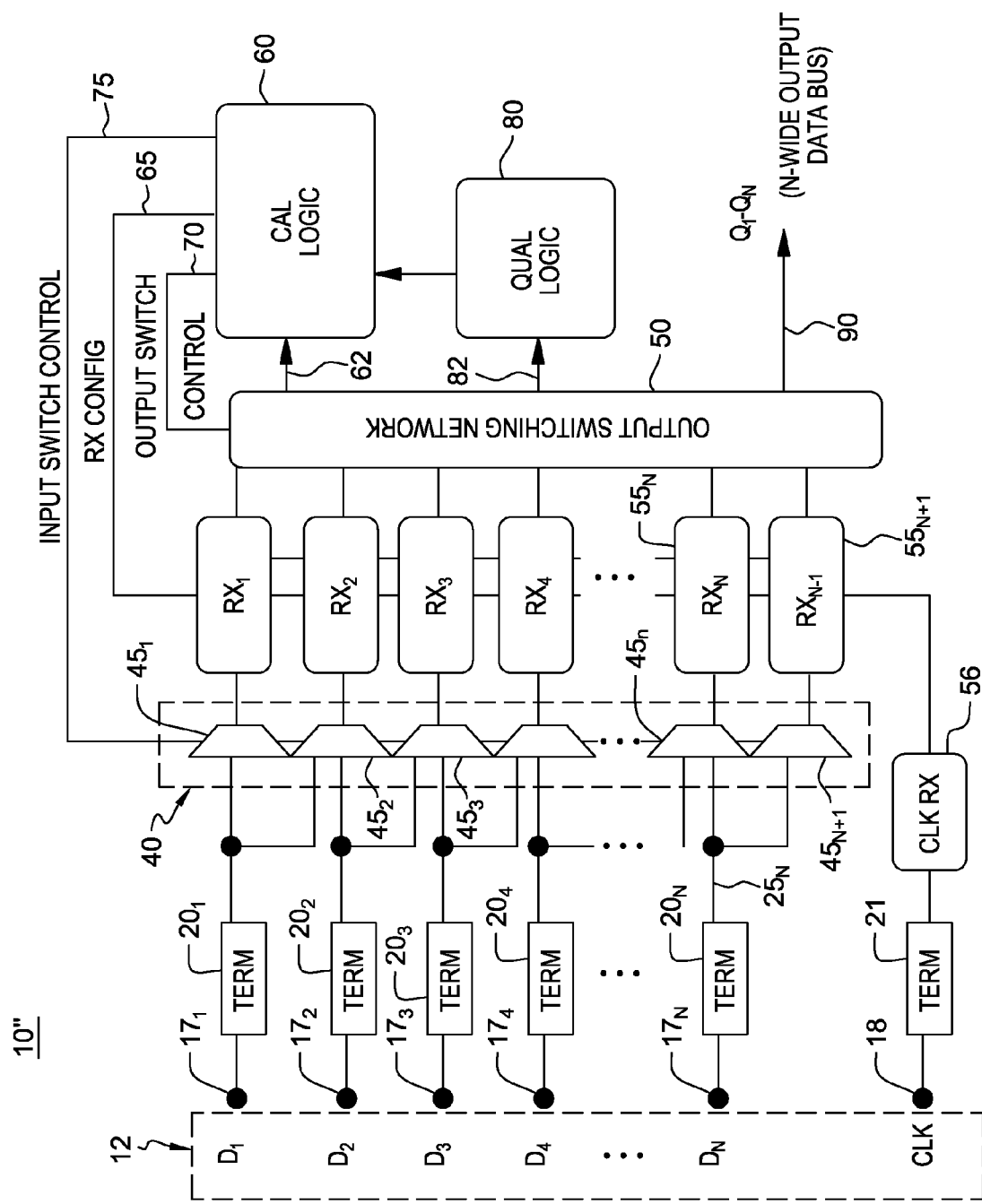
FIG. 3 depicts an embodiment of a parallel receiver architecture 10" using receiver redundancy in a source synchronous architecture.

FIG. 3 shows an alternate embodiment of the parallel I/O bus interface of FIG. 1, in which circuitry is provided to receive a forwarded clock in a source synchronous I/O architecture 10". In the embodiment of FIG. 3, a data source transmitter (not shown) broadcasts a clock CLK signal on a separate channel on the bus 20 in parallel with the multiple bits (bus data) $D_1, \ldots, D_N$. This technique alleviates the need for a high-bandwidth clock recovery loop, since timing jitter on the incoming data is correlated to timing jitter on the forwarded clock. At multi-Gb/s data rates, the received clock signal is aligned to each data bit such that all bit receivers in the bus optimally sample the incoming data. In the source synchronous parallel I/O bus interface 10", a clock (CLK) signal is received from respective transmitter over a clock line of bus 12 to respective I/O pin 18 having a respective connected impedance matching input connector or terminal 21 (e.g., a 50 ohm connector). Terminal 21 is coupled to a clock receiver device 56 (CLK RX). Mechanisms or methods for adjustment or rotation of the clock phase can be included in the clock receiver device 56, and/or may be contained in each of the bit receivers $55_1$ through $55_{N+1}$.

Further, in another embodiment, the source synchronous parallel I/O bus interface 10" implements global phase interpolators to set the sampling clock phase for all N+1 receivers. In an example implementation, two (2) phase interpolators are used and it is assumed that their operation may include similar techniques as described in commonly-owned, co-pending U.S. patent application Ser. No. 13/157,968 filed Jun. 10, 2011, the whole contents and disclosure of which is incorporated by reference as if fully set forth herein.

Figure 4:
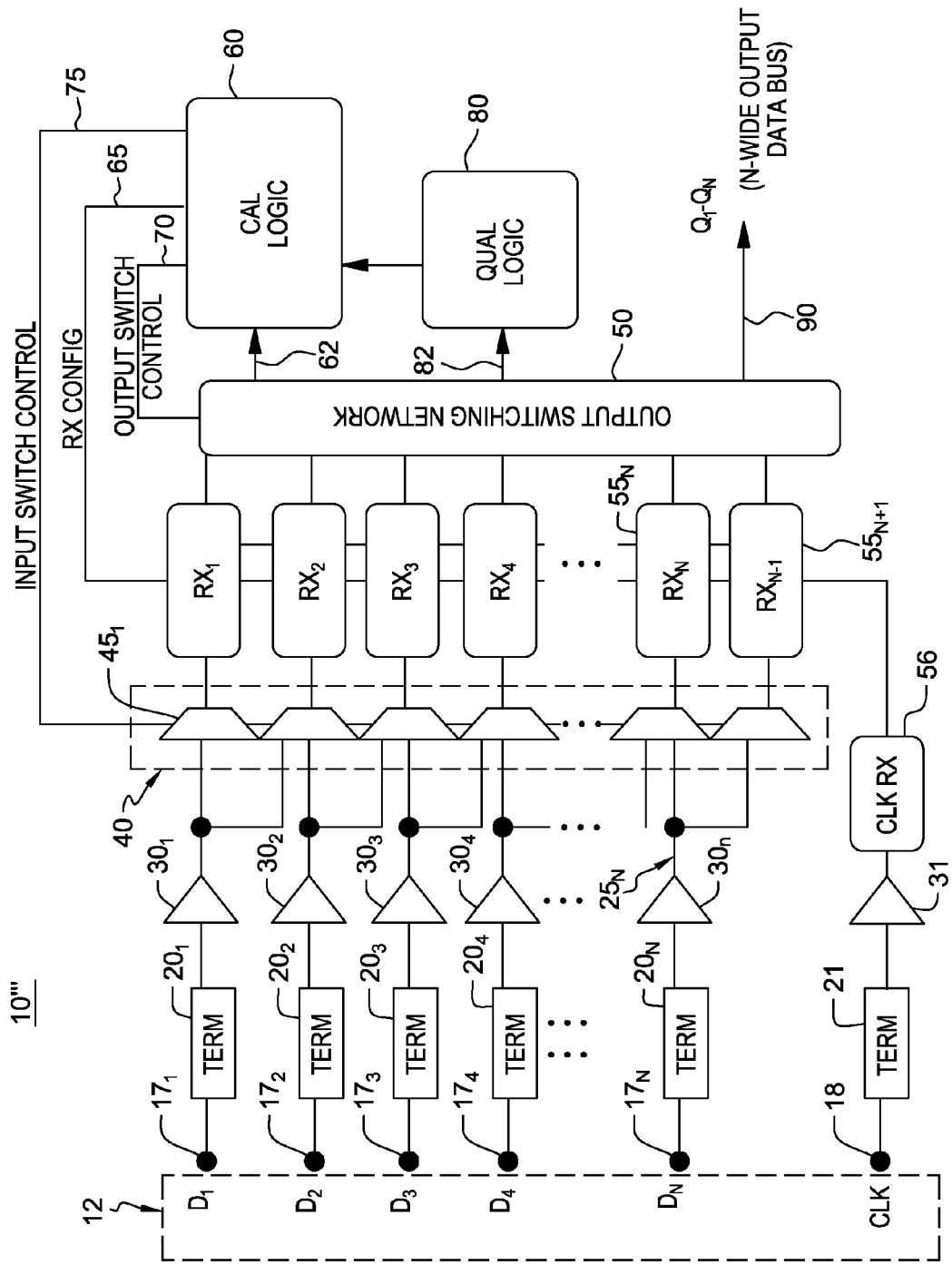
FIG. 4 depicts an alternate embodiment of a parallel receiver architecture 10''' using receiver redundancy in a source synchronous architecture; and, FIGS. 5A-5D depict a flow chart illustrating one method to calibrate all receivers in the parallel interface one at a time, in both a first and second directions.

FIG. 4 depicts an alternate embodiment of a source-synchronous parallel receiver architecture 10"' using receiver redundancy as in the embodiment of FIG. 3, however, is configured to include corresponding amplifier device or circuit $30_1, \ldots, 30_N$ connected between a respective input pin $17_1, \ldots, 17_N$/termination $20_1, \ldots, 20_N$ and corresponding MUXs of the input switching network 40, and includes a further amplifier device or circuit 31 connected between a respective input pin 18/termination 21 and the corresponding clock receiver device 56 (CLK RX) in the source synchronous embodiment.

In each of the parallel I/O bus interface embodiments described with respect to FIGS. 1-4, and from the programmed Calibration Logic described below, a second receiver RX is available to provide data necessary to qualify or filter decisions from an adjacent RX being calibrated. In the configuration of interface depicted FIGS. 1-4, it is ensured that another receiver is receiving the same data as the receiver that is being calibrated, such that the qualifications can be made.

Further, while N pins are used to receive the N data bits, the embodiments of FIGS. 1-4 are alternately configured to receive differential data, in which 2*N pins would be required. Additionally, the data in signals $D_1$ through $D_N$ could contain multiple bits of information in a single symbol depending on the signaling scheme employed (e.g., pulse amplitude modulation).

Further, in each of the embodiments depicted in FIGS. 1-4, each of the bit receivers RX provide latched data signals to an output switching network 50 which may include a configuration of multiplexers or switches, but it may include a (first-in, first-out) FIFO structure that allows for data handoff between two different clock domains, and is usually required when the logic clock (the clock for the CAL logic block 60 and QUAL logic block 80) differs from the clock used for the receivers. In certain embodiments described herein above, the output switching network 50 could also include a word aligner to compensate for skew between bits and provide the referred to data alignment.

Further, in the embodiments depicted in FIGS. 1-4, the receiver calibration logic implements an algorithm 100 represented by the pseudocode described herein below and depicted in FIGS. 5A-5D. This algorithm permits for periodic recalibration of all N+1 bit receivers, one at a time, while the other N bit receivers recover data. A programmed processor device or logic controller of the receiver and calibration logic device (CAL LOGIC) 60 may implement the algorithm to control the input switching network 40 through input switch control signals 75 and the output control network 50 through output switch control signals 70 to enable periodic recalibration of all bit receivers in the parallel interface. The algorithm configures the input network 40 and output switching network 50 such that the output a single bit receiver can be coupled to the calibration logic 60, the output of an adjacent bit receiver can be coupled to the qualification logic 80 as may be required by a calibration procedure, and data can be passed from the input pins ($D_1$ through $D_N$) to corresponding output pins 90 ($Q_1$ through $Q_N$).

In addition, receiver calibration logic device 60 generate and provide the receiver configuration control signals 65 that provide tuning parameters (e.g., gain settings, equalizer settings, or sampling phase positions) to the receiver during the calibration process. Upon completion of a bit receiver calibration, these tuning parameters can be stored in a logic register (either located within the calibration logic 60 or within the respective bit receivers $55_1$ through $55_{N+1}$) and are held constant until the receiver is recalibrated.

It is understood that implementation of a FIFO or a word aligner would depend on implementation specific situations, such as skew conditions between $D_1$ through $D_N$, and any frequency offset between the clocks that the logic runs off of (not shown) and the clock that the receivers operate off of (e.g., for the case of the source synchronous architecture).

In an alternate embodiment, the receiver RX device 55 may include a de-serializer element to cover situations where the output switching network 50 is implemented as low-speed synthesized logic as opposed to high-speed analog or high-speed custom digital logic. It is understood that the inclusion of a deserializer would increase the width of the parallel output bus Q from N to M*N, where M is the deserialization factor.

The method below, when implemented, steps down through the parallel configuration of receiver devices $55_1, \ldots, 55_{N+1}$ (i.e., "walking" from the top receiver to the bottom receiver), calibrating each one while ensuring that data is still processed on another receiver and passed through to the output. After stepping down, there is then the need to step up (i.e., walking from the bottom to the top). The calibration logic handles the configuration of all the input/output switching networks, as well as the calibration of the individual receivers. The actual calibration of a receiver is performed at steps 2d) and 3d) below; all other steps are there to ensure uninterrupted data transmission from the input D to the outputs 90 Q. This calibration could include, but is not limited to: sampling phase or timing adjustment, offset compensation, equalizer adaptation or retraining, link diagnostics and eye margin measurements.

The following psuedocode represents the interfaces in the embodiments of FIGS. 1-4 using N+1 receiver such that one of those receivers could be calibrated while N receivers are always available to receive the N bits of data. That is, the algorithm cycles through N+1 receivers to permit periodic recalibration of each receiver (one at a time) while N inputs are processed continuously and uninterrupted.

FIGS. 5A-5D depict a flow chart illustrating a method 100 to calibrate all receivers in the parallel interface one at a time, in both a first and second direction, according to one embodiment. At the end of the calibration in the second direction, the state of the input and output switching networks are configured such that calibrations using this algorithm could resume at a later time.

1. At step 102, FIG. 5A, the bus calibration comprises:
   a. At 105, FIG. 5A, first the input switch network is configured to couple all data $D_j$ to corresponding receiver $RX_{j+1}$. This may include performing the following:
   Enter a loop wherein, For j=1 to N, calibration logic (CAL LOGIC) block 60 configures input switch network 40 such that $D_j$ is coupled to $RX_{j+1}$.
   b. Then at 107, FIG. 5A, there is performed configuring an output switch network to couple all receivers $RX_{j+1}$ to corresponding output data $Q_j$. This may include performing the following:
   Enter a loop wherein, For i=1 to N, configure, using control signals 70, output switch network 50 such that $RX_{j+1}$ is coupled to $Q_j$.
2. The receiver calibration logic is initiated comprising a "walking down" through the receivers while calibrating each receiver in the process:
   That is, a loop is entered wherein, For j=1 to N there is performed:
   a. At 109, FIG. 5A, calibration logic block 60 configures, using control signals 75, input switch network 40 such that $D_j$ is coupled to $RX_j$ and $RX_{j+1}$;
   b. At 112, FIG. 5A, calibration logic configures, using control signals 70, output switch network 50 such that the output 62 of $RX_j$ is coupled to the calibration logic (CAL LOGIC) block 60;
   c. At 115, FIG. 5A, calibration logic configures, using control signals 70, output switch network 50 such that the output 82 of $RX_{j+1}$ is coupled to the calibration qualification logic (QUAL LOGIC) block 80;
   d. At 120, FIG. 5A, calibration logic configures, using control signals 65, RX control in order to calibrate $RX_j$, using data from $RX_j$ and data qualifications from $RX_{j+1}$ as required by any and all calibration algorithms. It is understood that while the psuedocode does not state how the receiver is being calibrated or what parameter within the receiver is being calibrated—it could be an equalizer setting, or an offset compensation, or a gain setting, or maybe a sampling clock phase adjustment—this depends on the particular RX block configuration.
   e. Complete calibration of $RX_j$ at 120 such that output of $RX_j$ is valid data $D_j$. Store appropriate settings for $RX_j$ in a register (not shown).
   f. Continuing at 125, FIG. 5B the calibration logic configures, using control signals 70, output switch such that the output of $RX_j$ is coupled to output $Q_j$;
   g. At 128, FIG. 5B, calibration logic configures input switch network such that $D_j$ is coupled only to $RX_j$;
   h. At 130, the receiver index "j" is incremented and a determination made at 135 whether the last receiver has been calibrated (i.e., j=N+1 where N is the number of receivers being calibrated;
   i. At 135, if it is determined that the last receiver has not been processed, the process returns to step 109, FIG. 5A, and the process steps 109-135 are repeated for the next receiver. Otherwise, the process proceeds to step 140, FIG. 5B where the receiver calibration logic is initiated comprising a "walking up" through the receivers while calibrating each receiver in the process:
3. The "walking up" calibration process proceeds at step 140, FIG. 5B, where, For j=N+1 to 2:
   a. At 140, FIG. 5B, calibration logic configures, using control signals 75, input switch network 40 such that $D_{j-1}$ is coupled to $RX_j$ and $RX_{j-1}$;
   b. At 143, FIG. 5B, calibration logic configures, using control signals 70, output switch network 50 such that the output of $RX_j$ is coupled to the calibration logic (CAL LOGIC) block 60;
   c. Continuing to 145, FIG. 5C, calibration logic configures, using control signals 70, output switch network such that the output of $RX_{j-1}$ is coupled to the calibration qualification logic (QUAL LOGIC);
   d. Continuing to 150, FIG. 5C, calibration logic configures, using control signals 65, RX control in order to calibrate $RX_j$, using data from $RX_j$ and data qualifications from $RX_{j-1}$ as required by any and all calibration algorithms. It is understood that the receiver, or a parameter within the receiver, is being calibrated such as, but not limited to, an equalizer setting, or an offset compensation, or a gain setting, or a sampling clock phase adjustment—this depends on the particular RX block configuration.
   e. At the end of the complete calibration of $RX_j$, the output of $RX_j$ is valid data from input $D_{j-1}$. The appropriate settings are stored for $RX_j$ in a register.
   f. Continuing to 153, FIG. 5C, the calibration logic configures output switch such that the output of $RX_j$ is coupled to output
   g. Continuing to 155, FIG. 5C, the calibration logic configures input switch network such that $D_{j-1}$ is coupled only to $RX_j$;
   h. At 160, the receiver index "j" is decremented, and a determination made at 165 whether the last receiver (in walking up) has been calibrated (i.e., when j=1);
   i. At 165, FIG. 5C, if it is determined that the last receiver has not been processed, the process returns to step 140, FIG. 5B, and the process steps 140-165 are repeated for the next receiver. Otherwise, the process proceeds to step 170, FIG. 5C where calibration recovery is performed.
4. Once done with calibration, then the process determines whether to perform a receiver recalibration of $RX_1$ by:
   a. At 170, determining whether to continue all receiver recalibrations; If it is determined that no recalibration is being performed, then the process proceeds directly to 175, FIG. 5D. Otherwise, if a recalibration is being performed, the process returns to step 109, FIG. 5A, and the receiver calibration steps are again performed.

b. If no receiver recalibration is being performed, then at 175, FIG. 5D, calibration logic configures, using control signals 75, input switch network 40 such that $D_1$ is coupled to $RX_1$ and $RX_2$;

c. At 180, FIG. 5D, the calibration logic configures, using control signals 70, output switch network 50 such that the output of $RX_1$ is coupled to the calibration logic (CAL LOGIC) block 60;

d. At 183, FIG. 5D, the calibration logic configures, using control signals 70, output switch network 50 such that the output of $RX_2$ is coupled to the calibration qualification logic (QUAL LOGIC) block 80;

e. At 185, FIG. 5D, the calibration logic configures, using control signals 65, RX control in order to calibrate $RX_1$, using data from $RX_1$ and data qualifications from $RX_2$ as required by any and all calibration algorithms.

f. Calibration of $RX_1$ is completed such that output of $RX_1$ is valid data derived from input $D_1$. Appropriate settings for $RX_1$ are stored in a register.

g. Then at 190, FIG. 5D, calibration logic configures, using control signals 70, output switch network 50 such that the output of $RX_2$ is coupled to output $Q_1$;

h. Then at 194, FIG. 5D, the calibration logic configures, using control signals 75, input switch network 40 such that $D_1$ is coupled only to $RX_2$.

i. Then the process terminates.

Figure 5A:
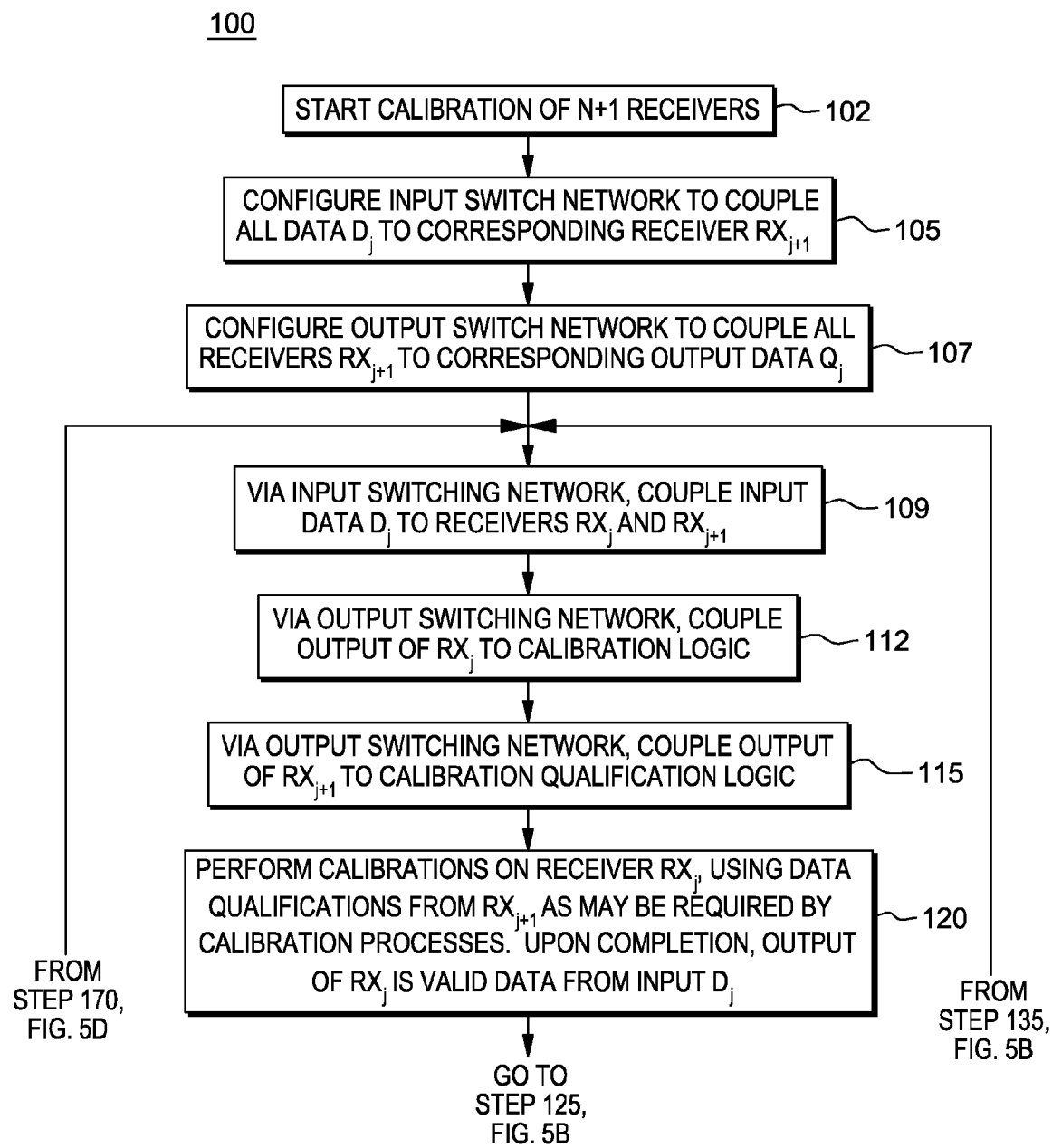
Figure 5B:
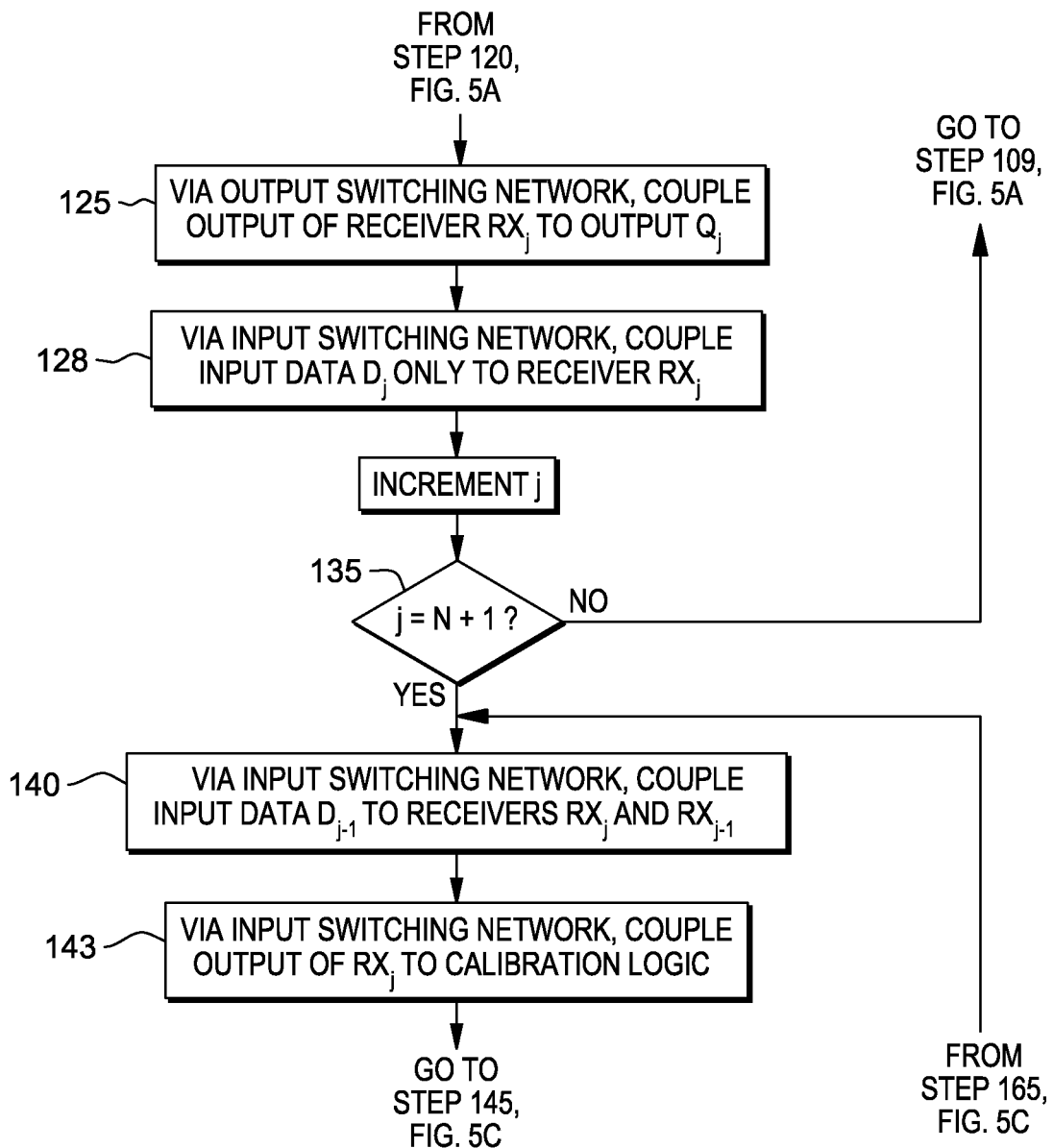
Figure 5C:
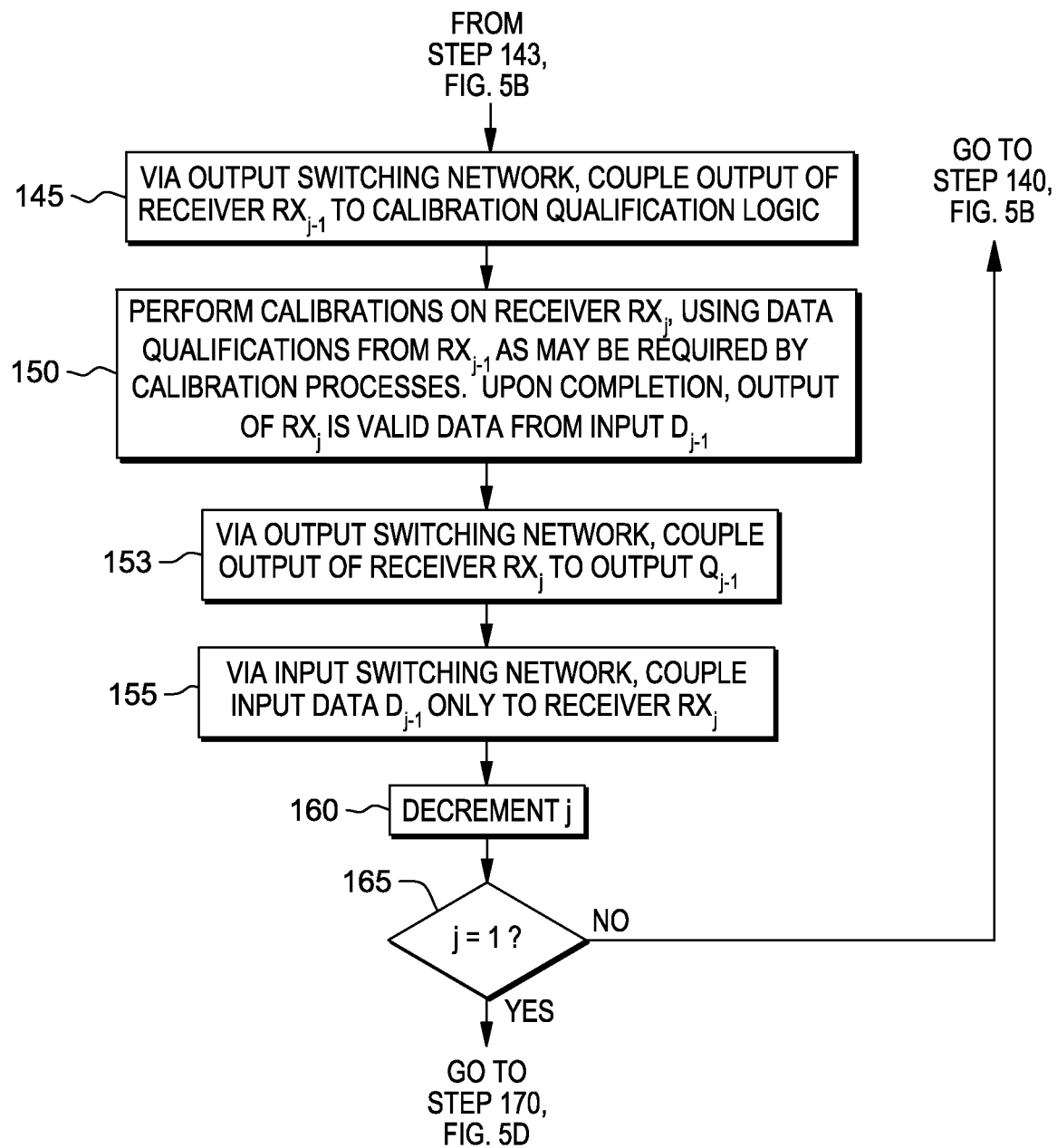
Figure 5D:
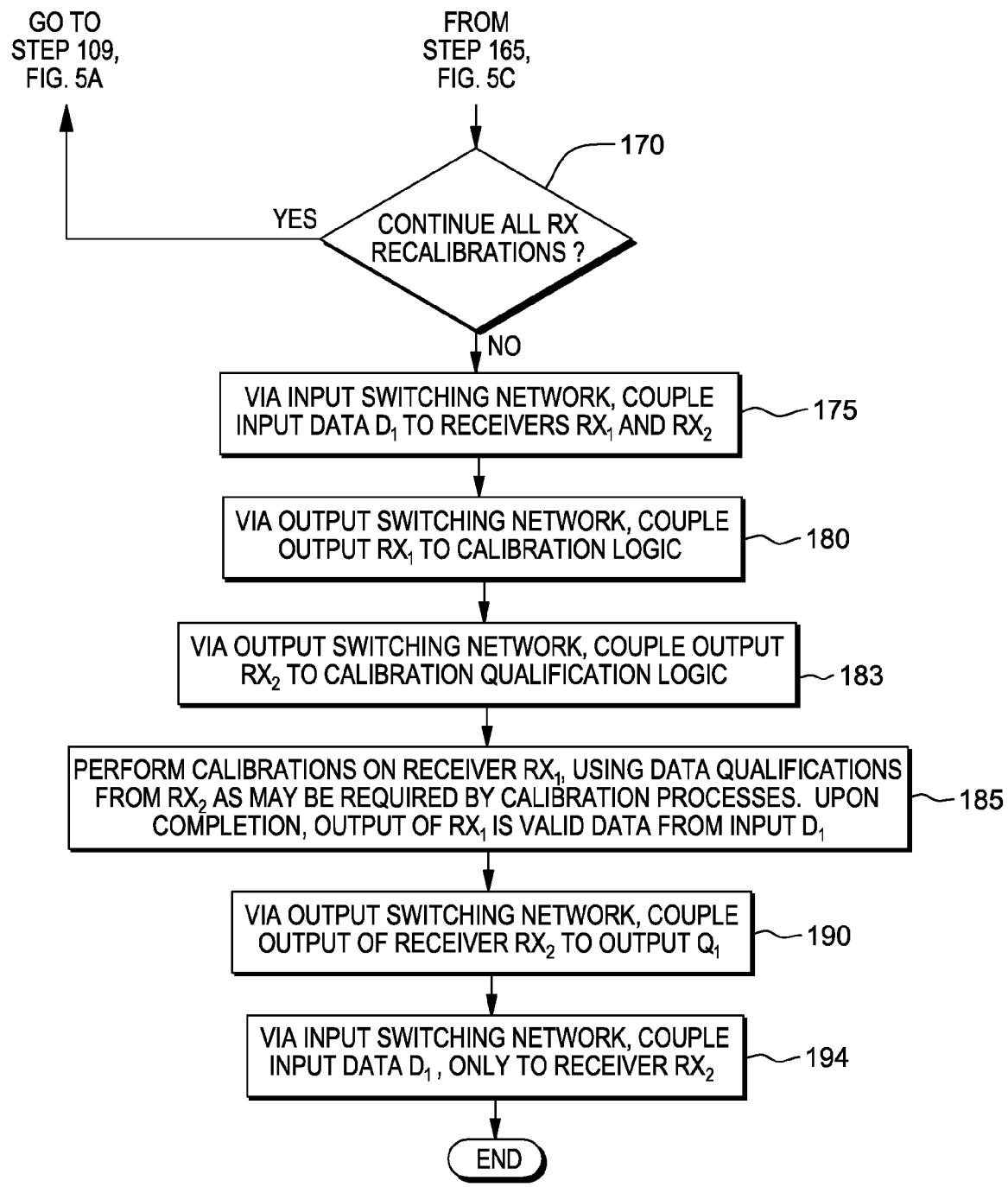
Figure 6A:
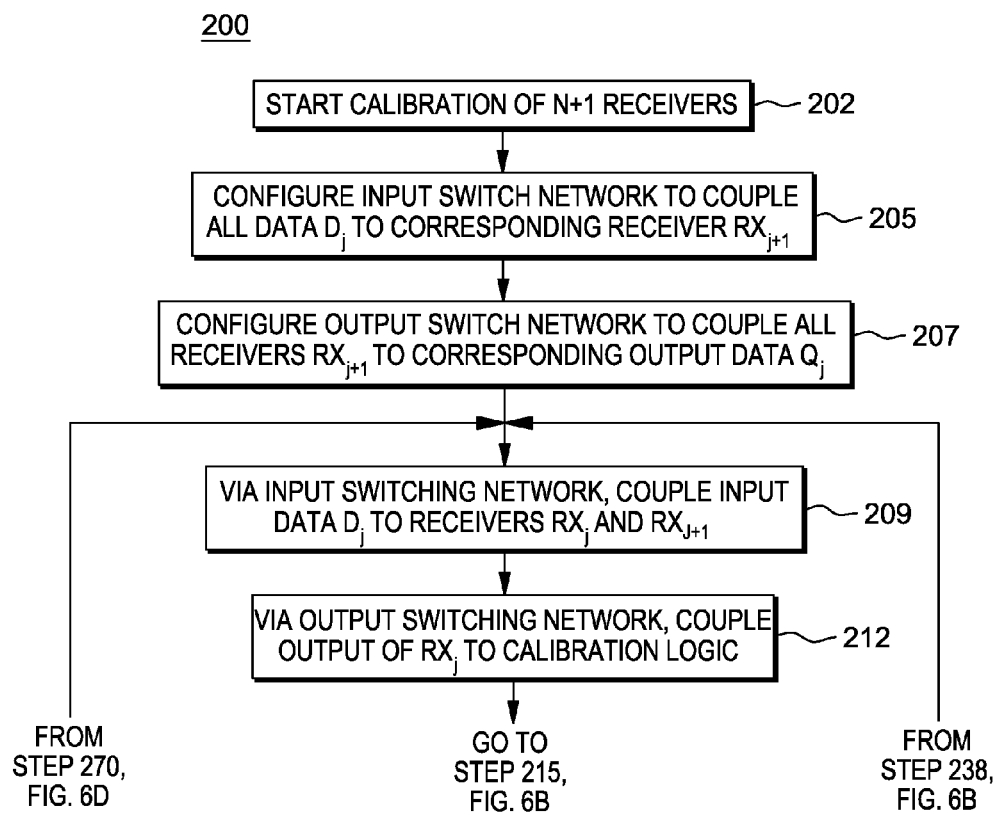
FIGS. 6A-6D depict a flow chart illustrating another method to calibrate all receivers in the parallel interface one at a time, in a first direction only.
Figure 6B:
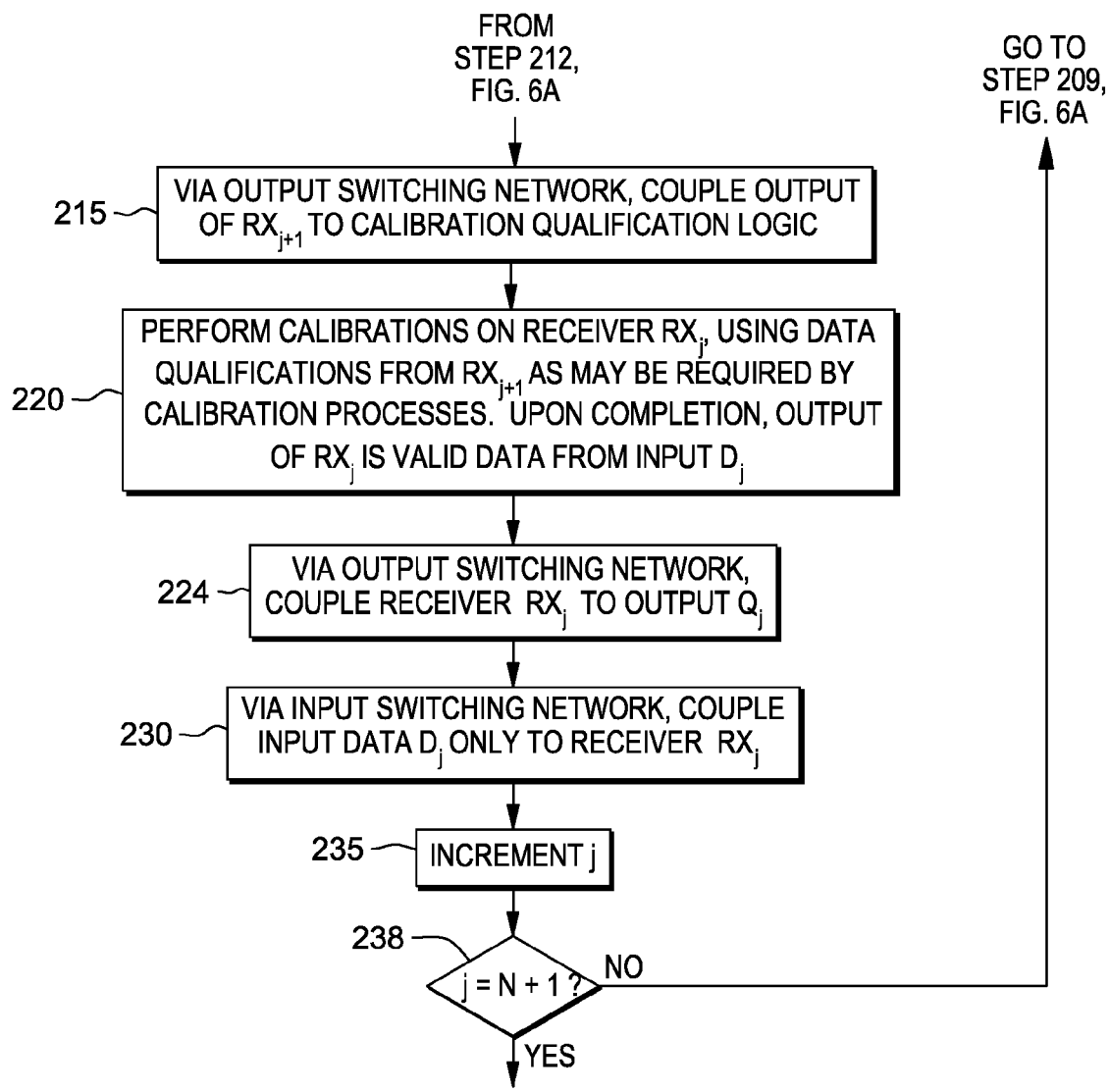
Figure 6C:
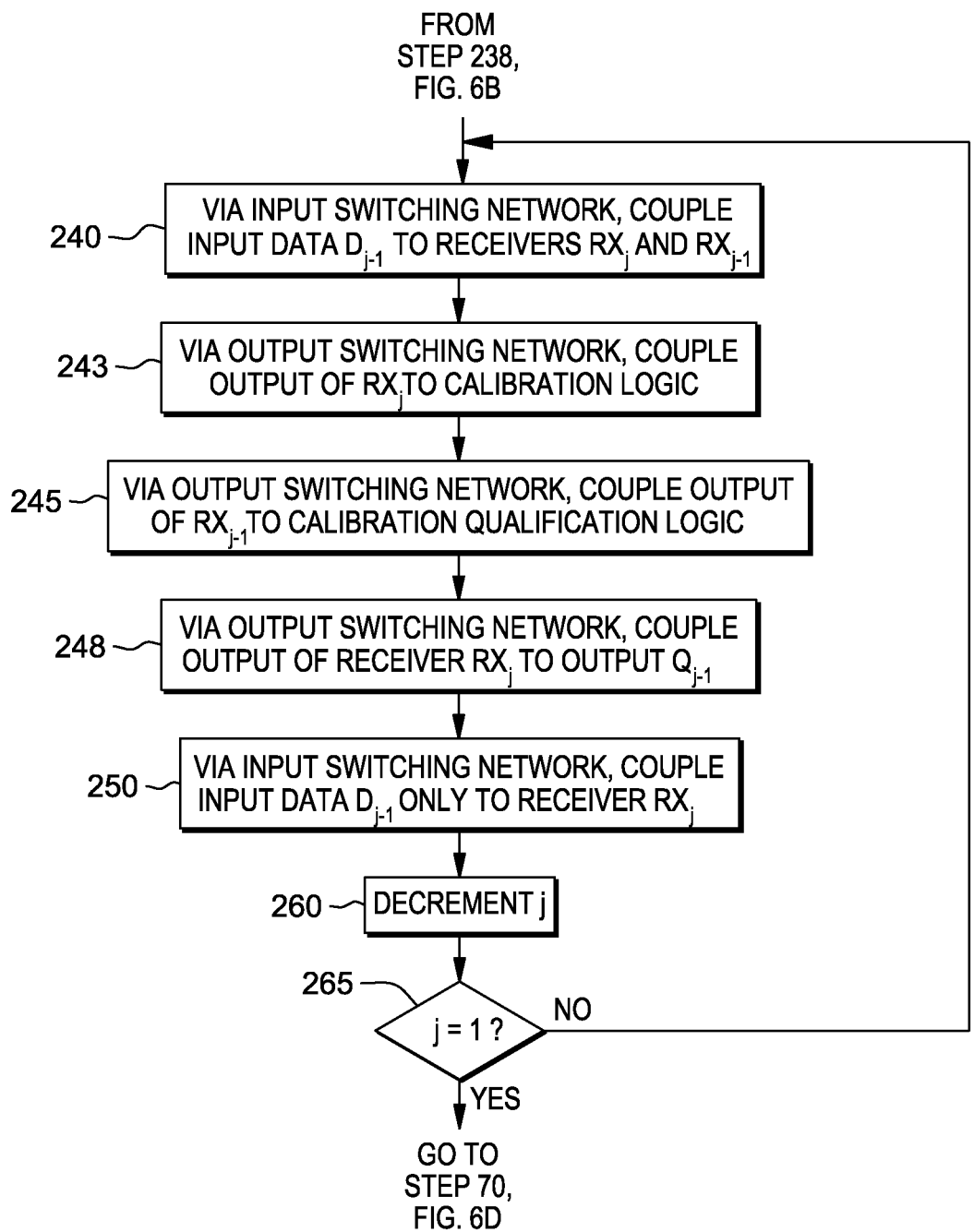
Figure 6D:
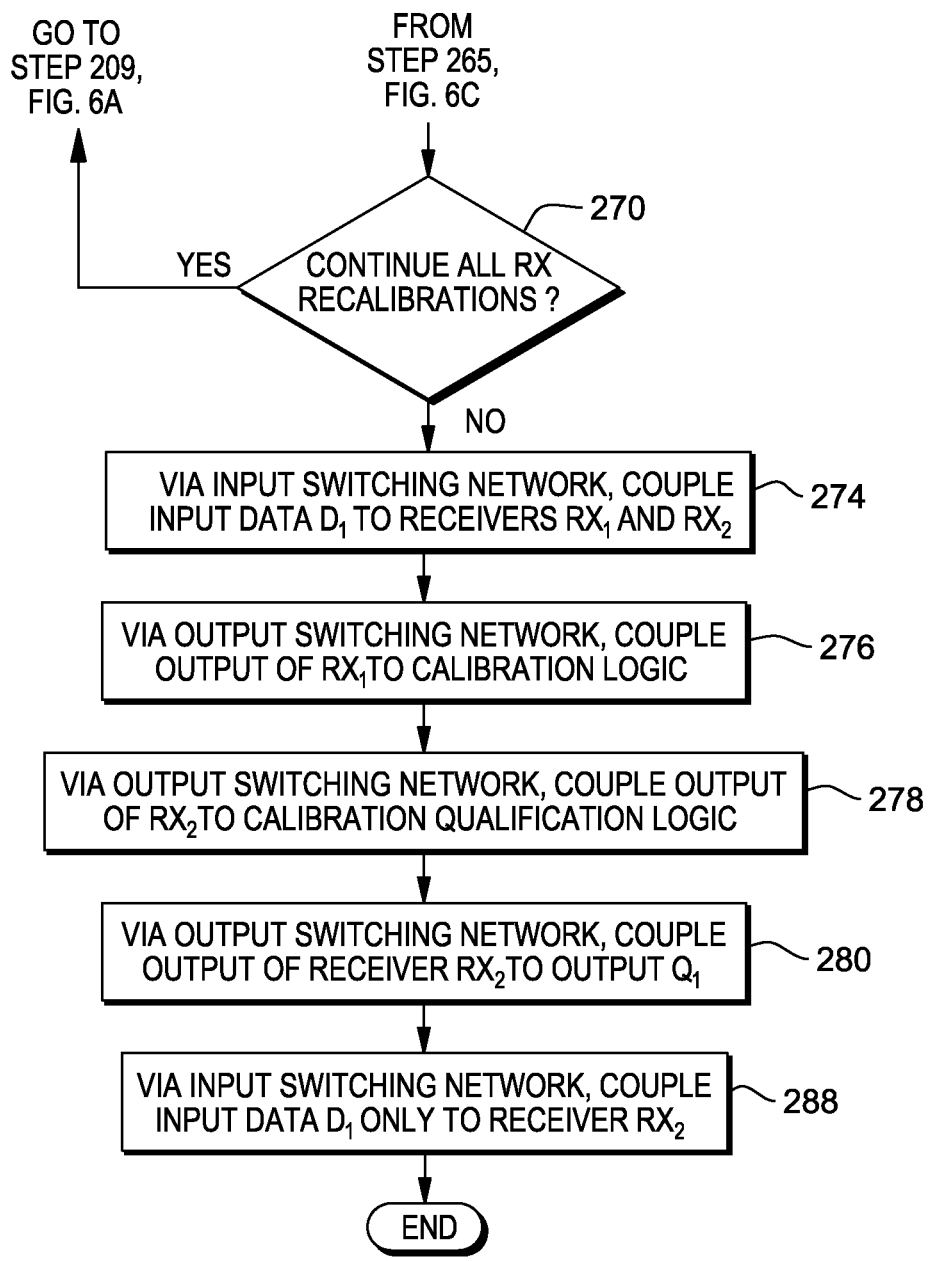

In the algorithm 100 depicted in FIG. 5A, the receiver calibration "for loop" in steps 2a) through 2i) performs "walking down" calibrating $RX_1$, then $RX_2$, then $RX_3$, all the way down to $RX_N$. The next receiver calibration "for loop" in step 3a) through 3i) then calibrates $RX_{(N+1)}$, and walks up through all the receivers to calibration $RX_N$, $RX_{(N-1)}$, etc. . . . back up to $RX_2$. Once calibration is repeated, then the process may return to the "for loop" in the "walking down" procedure of step 2, which would then pick up the next calibration of $RX_1$.

In an alternative embodiment for cycling through N+1 receivers to permit periodic recalibration of each receiver (one at a time) while N inputs are processed continuously and uninterrupted, the receivers are not calibrated during the "walk up" procedure in step 3. A corresponding flow chart is depicted in FIGS. 6A-6D which depicts a flow chart illustrating a method 200 to calibrate all receivers in the parallel interface according to an alternate embodiment.

1. At step 202, FIG. 6A, the bus calibration of N+1 receivers comprises:
    a. At 205, FIG. 6A, first the input switch network is configured to couple all data $D_j$ to corresponding receiver $RX_{j+1}$. This may include performing the following:
    For j=1 to N, calibration logic (CAL LOGIC) configures input switch network such that $D_j$ is coupled to $RX_{j+1}$;
    b. Then at 207, FIG. 6A, there is performed configuring For j=1 to N, configure output switch network such that $RX_{j+1}$ is coupled to Q;
2. The receiver calibration logic is initiated by "walking down" through the receivers while calibrating each receiver in the walk down process:
That is, a loop is entered wherein, For j=1 to N:
    a. At 209, FIG. 6A, calibration logic configures input switch network 40 such that $D_j$ is coupled to $RX_j$ and $RX_{j+1}$;
    b. At 212, FIG. 6A, calibration logic configures output switch network 50 such that the output of $RX_j$ is coupled to the calibration logic (CAL LOGIC) block 60;
    c. At 215, FIG. 6B, calibration logic configures output switch network 50 such that the output of $RX_{j+1}$ is coupled to the calibration qualification logic (QUAL LOGIC) block 80;
    d. At 220, FIG. 6B, calibration logic configures, using control signals 65, calibration logic configures RX control in order to calibrate $RX_j$, using data from $RX_j$ and data qualifications from $RX_{j+1}$ as required by any and all calibration algorithms;
    e. Complete calibration of $RX_j$ at 220 such that output of $RX_j$ is valid data derived from input $D_j$. The appropriate settings for $RX_j$ are then stored in a register;
    f. Continuing at 225, FIG. 6B, calibration logic 60 configures output switch network 50 such that the output of $RX_j$ is coupled to output $Q_j$;
    g. Continuing at 230, FIG. 6B, calibration logic configures input switch network such that $D_j$ is coupled only to $RX_j$;
    h. Continuing at 235, the receiver index "j" is incremented and a determination made at 240 whether the last receiver has been calibrated (i.e., j=N+1 where N is the number of receivers being calibrated;
    i. At 238, if it is determined that the last receiver has not been processed, the process returns to step 209, FIG. 6A, and the process steps 209-238 are repeated for the next receiver. Otherwise, the process proceeds to step 240, FIG. 6C where the method performs a "walking up" through the receivers, without calibrating each receiver, to ensure that input/output switches are in the proper state such that step 2 can be repeated.
3. The "walking up" process without receiver calibration proceeds at step 240, FIG. 6B, where, For j=N+1 to 2:
    a. At 240, FIG. 6C, calibration logic configures input switch network 40 such that $D_{j-1}$ is coupled to $RX_j$ and $RX_{j-1}$;
    b. At 243, FIG. 6C, calibration logic configures output switch network 50 such that the output of $RX_j$ is coupled to calibration logic block 60, and at 245, the output switch network 50 is configured such that the output of $RX_{j-1}$ is coupled to the calibration qualification logic block 80;
    c. At 248, FIG. 6C, via output switching network, output of receiver $RX_j$ is coupled to output $Q_{j-1}$; and
    d. At 250, calibration logic configures input switch network 40 such that $D_{j-1}$ is coupled only to $RX_j$.
    e. At 260, the receiver index "j" is decremented, and a determination made at 265 whether the last receiver (in walking up) has been configured (i.e., when j=1);
    f. At 265, FIG. 6C, if it is determined that the last receiver has not been processed, the process returns to step 240, FIG. 6C, and the process steps 240-265 are repeated for the next receiver. Otherwise, the process proceeds to step 270, FIG. 6D where a determination is made whether to continue to perform all receiver re-calibrations.
    g. At 270, a determination is made whether to continue all receiver recalibrations; If it is determined that no recalibration is being performed, then the process proceeds directly to 274, FIG. 6D. Otherwise, if a recalibration is being performed, the process returns to step 209, FIG. 6A, and perform repeating periodic recalibration of all bit receivers as necessary.

h. At 274, FIG. 6D, if no receiver recalibration is being performed, then calibration logic configures, using control signals 75, input switch network 40 such that $D_1$ is coupled to $RX_1$ and $RX_2$;

i. At 276, FIG. 6D, the calibration logic configures, using control signals 70, output switch network 50 such that the output of $RX_1$ is coupled to the calibration logic (CAL LOGIC) block 60;

j. At 278, FIG. 6D, the calibration logic configures, using control signals 70, output switch network 50 such that the output of $RX_2$ is coupled to the calibration qualification logic (QUAL LOGIC) block 80;

k. Then at 280, FIG. 6D, calibration logic configures, using control signals 70, output switch network 50 such that the output of $RX_2$ is coupled to output $Q_1$;

l. Then at 288, FIG. 6D, the calibration logic configures, using control signals 75, input switch network 40 such that $D_1$ is coupled only to $RX_2$.

m. Then the process terminates.

Figure 7:
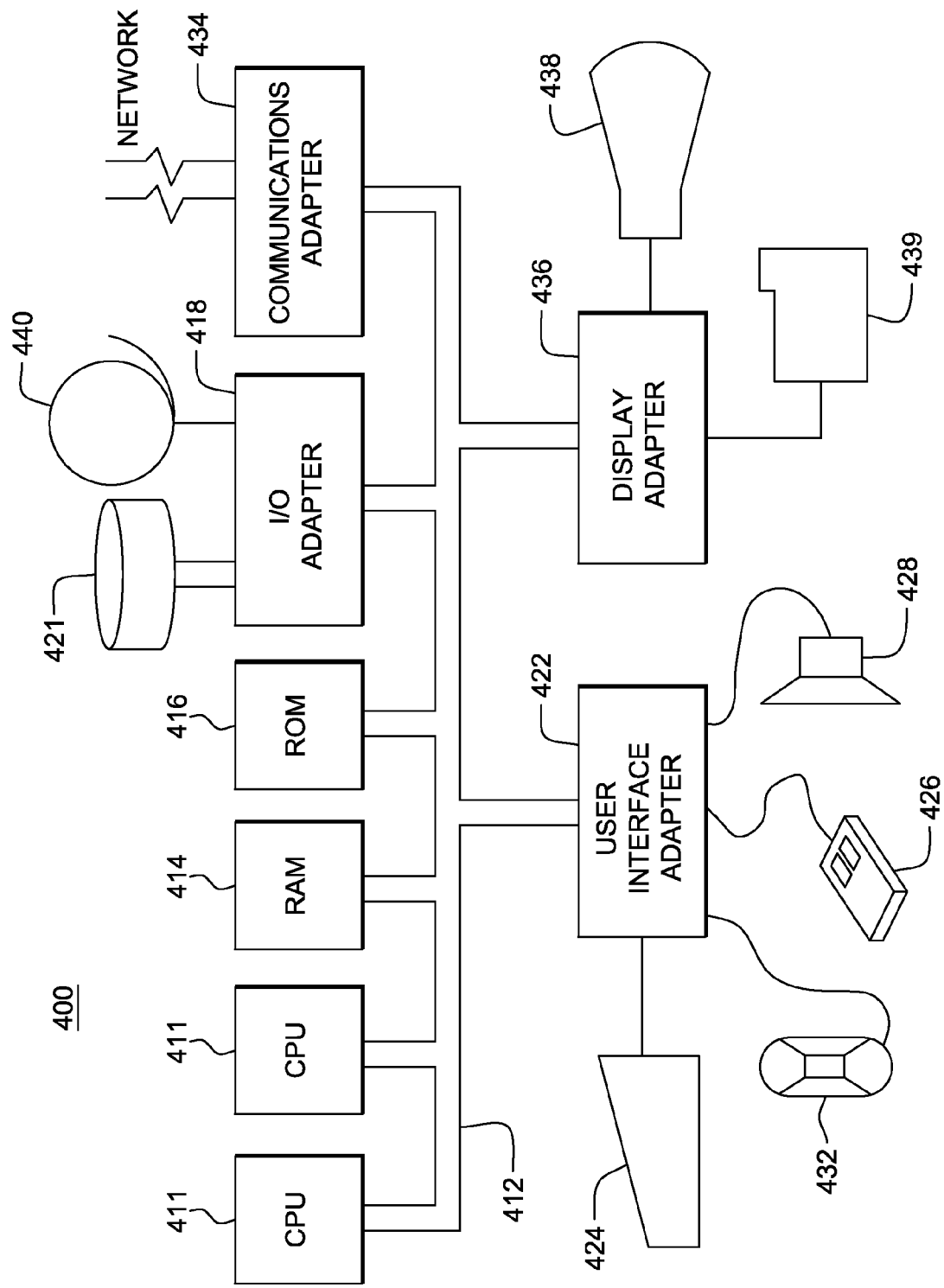
FIG. 7 illustrates an exemplary hardware configuration of a computing system 400 running and/or implementing the bus interface methods of the described embodiments.

FIG. 7 illustrates an exemplary hardware configuration of a computing system 400 running and/or implementing the parallel bus interface and method of operating as described herein with respect to FIGS. 1-4. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

The invention claimed is:

1. A parallel I/O bus receiver interface comprising:
an input switching network configured to receive and couple N parallel data signals along respective paths to N+1 parallel-configured bit receiver (RX) devices, wherein one received data signal is coupled to two adjacent bit receivers of said N+1 receivers;
a calibration logic device used for calibrating one of said two adjacent bit receivers;
a qualification logic device used to qualify data decisions made during calibration processes performed by the calibration logic device; and
an output switching network configured to route an output of the bit receiver being calibrated to said calibration logic block, and simultaneously route outputs of the remaining N bit receivers of the N+1 parallel-configured receivers as N-bit wide parallel data signal outputs, wherein an output of one output of the remaining N bit receivers is simultaneously routed to said qualification logic block.

2. The parallel I/O bus receiver interface of claim 1, further comprising: an input to receive a forwarded clock signal from a transmitter for timing data receiver operations.

3. The parallel I/O bus receiver interface of claim 2, further comprising: one or more of: an amplifier circuit, buffer circuit or equalizer circuit on each respective paths for driving the N data signals to the input switching network.

4. The parallel I/O bus receiver interface of claim 1, further comprising: one or more of: an amplifier circuit, buffer circuit or equalizer circuit on each respective path for driving the N data signals to the input switching network.

5. The parallel I/O bus receiver interface of claim 1, wherein said input switching network comprises: N+1 parallel-configured Multiplexer (MUX) devices in correspondence with said N+1 parallel-configured bit receiver devices, where the inputs of each MUX are coupled to one or more of N parallel data signals.

6. The parallel I/O bus receiver interface of claim 1, wherein said calibration logic device issues control signals for configuring each said N+1 parallel-configured Multiplexer (MUX) devices of said input switching network to pass said received N parallel data signals to respective bit receiver devices, two of said parallel-configured MUX devices configured to route a single received data signal to said two adjacent bit receiver devices.

7. The parallel I/O bus receiver interface of claim 1, wherein said calibration logic device issues control signals to configure N of said N+1 parallel-configured bit receiver devices to receive and process a respective received bit data signal for said N-bit wide parallel data signal outputs.

8. The parallel I/O bus receiver interface of claim 1, wherein said calibration logic device issues control signals to configure said output switching network to provide said N-bit wide parallel data signal outputs.

9. The parallel I/O bus receiver interface of claim 1, wherein said calibration logic device issues control signals to perform periodic recalibration of each said N+1 parallel-configured bit receiver devices.

10. A method for calibrating receivers of a parallel I/O bus receiver interface, said method comprising:
configuring an input switching network to receive and couple N parallel data signals along respective paths to N+1 parallel-configured bit receiver devices, wherein said switching network is configured to couple one received data signal to two adjacent bit receivers of said N+1 receivers;
calibrating, using a calibration logic device, one of said two adjacent bit receiver devices;
qualifying, using a qualification logic device, data decisions made during calibration processes performed by the calibration logic device; and
configuring an output switching network to route an output of the bit receiver being calibrated to said calibration logic block, and simultaneously route outputs of the remaining N bit receivers of the N+1 parallel-configured receivers as N-bit wide parallel data signal outputs, wherein an output of one output of the remaining N bit receivers is simultaneously routed to said qualification logic block.

11. The method for calibrating receivers of claim 10, further comprising: receiving a forwarded clock signal from a transmitter for timing receiver operations at said interface.

12. The method for calibrating receivers of claim 11, further comprising: providing one or more of: an amplifier circuit, buffer circuit or equalizer circuit on each respective path for driving the received N data signals to the input switching network.

13. The method for calibrating receivers of claim 10, further comprising: providing one or more of: an amplifier circuit, buffer circuit or equalizer circuit on each respective path for driving the received N data signals to the input switching network.

14. The method for calibrating receivers of claim 1, wherein said input switching network comprises: N+1 parallel-configured Multiplexer (MUX) devices in correspondence with said N+1 parallel-configured bit receiver devices, where the inputs of each MUX are coupled to one or more of said N parallel data signals.

15. The method for calibrating receivers of claim 14, further comprising:
issuing, by said calibration logic device, control signals to perform periodic recalibration of each said N+1 parallel-configured bit receiver devices.

16. The method for calibrating receivers of claim 15, wherein said issued control signals to perform periodic recalibration further comprises: control signals to configure each said N+1 parallel-configured Multiplexer (MUX) device of said input switching network to pass said received N parallel data signals to respective N bit receiver devices providing said N-bit wide parallel data signal outputs, two of said parallel-configured MUX devices configured to route a single received data signal to two different adjacent bit receiver devices in each period.

17. The method for calibrating receivers of claim 15, wherein said issued control signals to perform periodic recalibration further comprises: control signals to configure N of said N+1 parallel-configured bit receiver devices to receive and process a respective received bit data signal for said N-bit wide parallel data signal outputs.

18. The method for calibrating receivers of claim 15, wherein said issued control signals to perform periodic recalibration further comprises: control signals to configure said output switching network to couple respective N bit receiver device outputs providing said N-bit wide parallel data signal outputs.

19. The method for calibrating receivers of claim 15, further comprising:

configuring said input and output switching network to:
cycle through said N+1 bit receivers in a first direction from 1 to N+1 to perform said calibrating of said N+1 receivers receiving N data signal to permit periodic recalibration of each receiver while simultaneously providing said N-bit wide parallel data signal outputs.

20. The method for calibrating receivers of claim 19, further comprising:

configuring said input and output switching network to:
cycle through said N+1 bit receivers in a second direction from N+1 to 1 to perform said calibrating of said N+1 receivers receiving N data signal to permit periodic recalibration of each receiver while simultaneously providing said N-bit wide parallel data signal outputs.

21. The method for calibrating receivers of claim 19, configuring said switching network to return to cycle through receivers from N+1 to 1 to perform the next calibration of N+1 bit receivers in said first direction.

* * * * *